United States Patent
Li et al.

(10) Patent No.: US 10,345,663 B2
(45) Date of Patent: Jul. 9, 2019

(54) METHOD OF WEAKENING LINE DEFECTS OF DISPLAY DEVICE

(71) Applicant: Shenzhen China Star Optoelectronics Semiconductor Display Technology Co., Ltd., Guangdong (CN)

(72) Inventors: Qiang Li, Guangdong (CN); Ting Dou, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 8 days.

(21) Appl. No.: 15/735,440

(22) PCT Filed: Nov. 2, 2017

(86) PCT No.: PCT/CN2017/109099
§ 371 (c)(1),
(2) Date: Dec. 11, 2017

(87) PCT Pub. No.: WO2019/015169
PCT Pub. Date: Jan. 24, 2019

(65) Prior Publication Data
US 2019/0113816 A1    Apr. 18, 2019

(30) Foreign Application Priority Data

Jul. 19, 2017 (CN) .......................... 2017 1 0592915

(51) Int. Cl.
*G02F 1/1362* (2006.01)

(52) U.S. Cl.
CPC .. *G02F 1/136259* (2013.01); *G02F 1/136286* (2013.01)

(58) Field of Classification Search
CPC ................ G02F 1/136259; G02F 1/136286
See application file for complete search history.

(56) References Cited

U.S. PATENT DOCUMENTS

| 2009/0021156 A1* | 1/2009 | Kinoshita ......... G02F 1/136259 313/504 |
| 2009/0021454 A1* | 1/2009 | Satou .................. H01L 51/5262 345/76 |

* cited by examiner

*Primary Examiner* — Donald L Raleigh
(74) *Attorney, Agent, or Firm* — Muncy, Geissler, Olds & Lowe, P.C.

(57) ABSTRACT

A method of weakening line defects of a display device is provided. Firstly, an abnormal phenomenon of the display device is detected, and abnormal pixels corresponding to the abnormal phenomenon are confirmed; secondly, display information outputted to each of the abnormal pixels is cleared; and finally, a light diffusion glue is coated on positions of the polarizing sheet corresponding to the abnormal pixels and two sides thereof, such that the abnormal pixels are covered by display information of two sides of the abnormal pixels by the light diffusion glue.

14 Claims, 2 Drawing Sheets

Pixel B

METHOD OF WEAKENING LINE DEFECTS OF DISPLAY DEVICE

FIELD OF INVENTION

The present disclosure relates to a technical field of displays, and more particularly to a method of weakening line defects of a display device.

BACKGROUND OF INVENTION

Display defects occur in manufacturing of a display device. The display defects includes a point defect, a line defect, etc., wherein the line defect strongly influences user vision. However, the prior art cannot repair the display defects. Once the display defects are found, the display device will be voided, causing great waste, and increasing manufacturing costs.

Hence, it is necessary to provide a method of weakening line defects of a display device to solve problems existing in conventional technologies.

SUMMARY OF INVENTION

The present disclosure provides a method of weakening line defects of a display device, so as to weaken display defects and reduce manufacturing costs.

According to the above-mentioned purpose, the present disclosure provides a method of weakening line defects of a display device, wherein the display device comprises a first substrate and a polarizing sheet disposed on the first substrate, and the method comprises steps of:

detecting an abnormal phenomenon of the display device, and confirming abnormal pixels corresponding to the abnormal phenomenon;

clearing display information outputted to each of the abnormal pixels; and coating a light diffusion glue on positions of the polarizing sheet corresponding to the abnormal pixels and two sides thereof, such that the abnormal pixels are covered by display information of two sides of the abnormal pixels by the light diffusion glue;

wherein the abnormal phenomenon includes one or more defects including a dark line defect, a bright line defect, a broken line defect, and a weaken line defect; and the step of detecting the abnormal phenomenon of the display device, and confirming the abnormal pixels corresponding to the abnormal phenomenon includes steps of:

executing a light-on test on the display device to display an image; and confirming the abnormal pixels by the image.

In the method of weakening line defects of the display device of the present disclosure, each of the abnormal pixels is connected with a data driving chip by a data line.

In the method of weakening line defects of the display device of the present disclosure, the display information is data signals output from the data driving chip.

In the method of weakening line defects of the display device of the present disclosure, the step of clearing the display information outputted to each of the abnormal pixels includes step of:

cutting the data line connected between the data driving chip and the abnormal pixel.

In the method of weakening line defects of the display device of the present disclosure, the data line connected between the data driving chip and the abnormal pixel is cut by a laser.

In the method of weakening line defects of the display device of the present disclosure, a spreading method is used to coat the light diffusion glue.

According to the above-mentioned purpose, the present disclosure further provides a method of weakening line defects of a display device, wherein the display device comprises a first substrate and a polarizing sheet disposed on the first substrate, and the method comprises steps of:

detecting an abnormal phenomenon of the display device, and confirming abnormal pixels corresponding to the abnormal phenomenon;

clearing display information outputted to each of the abnormal pixels; and coating a light diffusion glue on positions of the polarizing sheet corresponding to the abnormal pixels and two sides thereof, such that the abnormal pixels are covered by display information of two sides of the abnormal pixels by the light diffusion glue.

In the method of weakening line defects of the display device of the present disclosure, the abnormal phenomenon includes one or more defects including a dark line defect, a bright line defect, a broken line defect, and a weaken line defect.

In the method of weakening line defects of the display device of the present disclosure, the step of detecting the abnormal phenomenon of the display device, and confirming the abnormal pixels corresponding to the abnormal phenomenon includes steps of:

executing a light-on test on the display device to display an image; and confirming the abnormal pixels by the image.

In the method of weakening line defects of the display device of the present disclosure, each of the abnormal pixels is connected with a data driving chip by a data line.

In the method of weakening line defects of the display device of the present disclosure, the display information is data signals output from the data driving chip.

In the method of weakening line defects of the display device of the present disclosure, the step of clearing the display information outputted to each of the abnormal pixels includes step of:

cutting the data line connected between the data driving chip and the abnormal pixel.

In the method of weakening line defects of the display device of the present disclosure, the data line connected between the data driving chip and the abnormal pixel is cut by a laser.

In the method of weakening line defects of the display device of the present disclosure, a spreading method is used to coat the light diffusion glue.

In the method of weakening line defects of a display device of the present disclosure, firstly, an abnormal phenomenon of the display device is detected, and abnormal pixels corresponding to the abnormal phenomenon are confirmed; secondly, display information outputted to each of the abnormal pixels is cleared; and finally, a light diffusion glue is coated on positions of the polarizing sheet corresponding to the abnormal pixels and two sides thereof, such that the abnormal pixels are covered by display information of two sides of the abnormal pixels by the light diffusion glue, so as to eliminate the influence in vision caused by the defect phenomenon, and manufacturing costs are also reduced.

To make the above content of the present invention more comprehensible, the preferred embodiments below with the accompanying drawings are described in detail.

DESCRIPTION OF DRAWINGS

The technical solution, as well as other beneficial advantages, of the present disclosure will be apparent from the following detailed description of an embodiment of the present disclosure, with reference to the attached drawings.

DETAILED DESCRIPTION OF PREFERRED EMBODIMENTS

In order to more clearly illustrate technical solutions of the embodiments or the prior art, accompany drawings which need to be used in the description of the embodiments or the prior art will be simply introduced. Obviously, the accompany drawings in the following description are merely some embodiments, and for those of ordinary skill in the art, other embodiments can be further obtained according to these accompany drawings without contributing any creative work.

Figure 1:
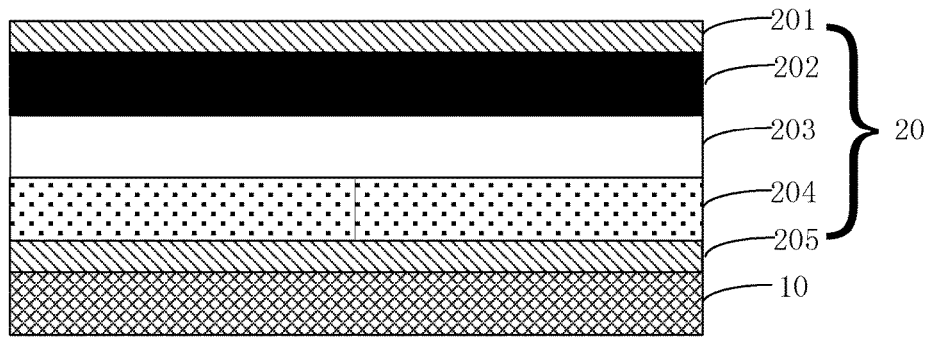
FIG. 1 is a schematic structural view of a conventional display device.

Refer now to FIG. 1, which is a schematic structural view of a conventional display device. As shown in FIG. 1, a conventional display device includes: a backlight module 10 and a display module 20 disposed on the backlight module 10. The display module 20 includes an upper substrate 202, an upper polarizing sheet 201 disposed on the upper substrate 202, a lower substrate 204, a lower polarizing sheet 205 disposed on the lower substrate 204; and a liquid crystal 203 disposed between the upper substrate 202 and the lower substrate 204. It should be noted that the displaying principle of the display device is that light emitted from the backlight module 10 passes through the lower polarizing sheet 205 to reduce polarizing lights, and the polarizing lights pass through the lower substrate 204, in which the lower substrate 204 can adjust a twist angle of the liquid crystal to make a required lights pass through the upper substrate 202 and the upper polarizing sheet 201, such that adjusted light information is displayed to user's eyes.

However, the conventional display device often has display defects, namely some portions of the display device may have poor display. The present disclosure will weaken the poor display, so as to reduce manufacturing costs.

Figure 2:
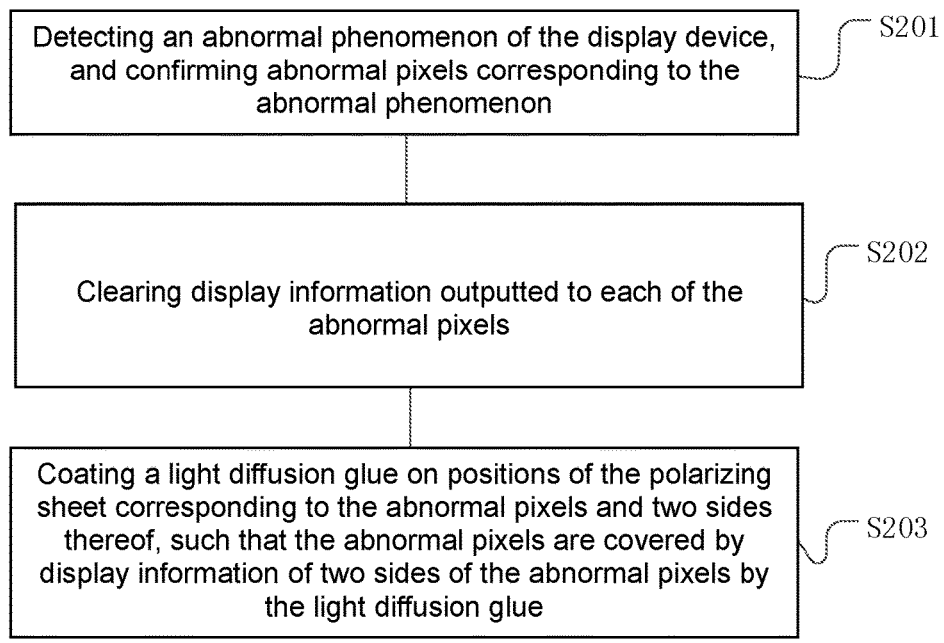
FIG. 2 is a schematic flowchart of a method of weakening line defects of a display device according to a preferred embodiment of the present disclosure.

Refer now to FIG. 2, which is a schematic flowchart of a method of weakening line defects of a display device according to a preferred embodiment of the present disclosure. As shown in FIG. 2, the preferred embodiment provides a method of weakening line defects of a display device. The display device includes a first substrate and a polarizing sheet disposed on the first substrate. The method includes steps of:

Step S201: detecting an abnormal phenomenon of the display device, and confirming abnormal pixels corresponding to the abnormal phenomenon;

Step S202: clearing display information outputted to each of the abnormal pixels; and Step S203: coating a light diffusion glue on positions of the polarizing sheet corresponding to the abnormal pixels and two sides thereof, such that the abnormal pixels are covered by display information of two sides of the abnormal pixels by the light diffusion glue.

The Steps S201, S202, and S203 are described in detail as follows.

In the Step S201, an abnormal phenomenon of the display device is detected, and abnormal pixels corresponding to the abnormal phenomenon are confirmed. Specifically, the abnormal phenomenon includes one or more defects including a dark line defect, a bright line defect, a broken line defect, and a weaken line defect. The preferred embodiment of the present disclosure uses the bright line defect as an example of the abnormal phenomenon, and for those of ordinary skill in the art, the executing method for other abnormal phenomenon can further be obtained according to following description, which is not repeat here.

The step of detecting an abnormal phenomenon of the display device, and confirming abnormal pixels corresponding to the abnormal phenomenon includes steps of: executing a light-on test on the display device to display an image, and confirming the abnormal pixels by the image.

Furthermore, each of the abnormal pixels is connected with a data driving chip by a data line, and the display information of the preferred embodiment is data signals output from the data driving chip.

In Step S202: display information outputted to each of the abnormal pixels is cleared, wherein the display information is the data signals output from the data driving chip.

The step of clearing display information outputted to each of the abnormal pixels includes a step of: cutting the data line connected between the data driving chip and the abnormal pixel.

Preferably, the data line connected between the data driving chip and the abnormal pixel can be cut by a laser.

In Step S203: a light diffusion glue is coated on positions of the polarizing sheet corresponding to the abnormal pixels and two sides thereof, such that the abnormal pixels are covered by display information of two sides of the abnormal pixels by the light diffusion glue.

Figure 3:
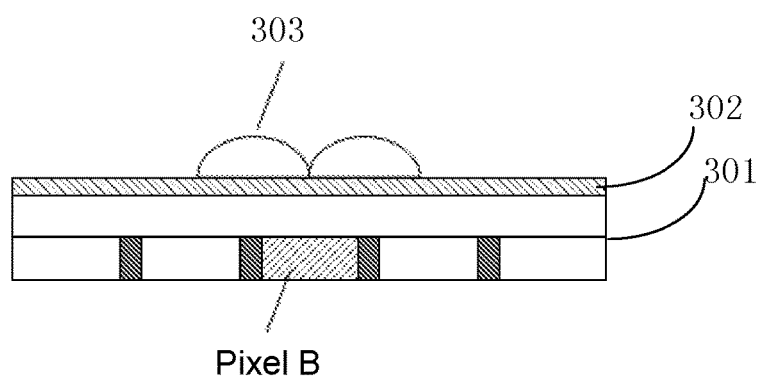
FIG. 3 is a schematic view showing a light diffusion glue coated in the method of weakening line defects of the display device according to the preferred embodiment of the present disclosure.

Specifically, refer now to FIG. 3, which is a schematic view showing a light diffusion glue is coated in the method of weakening line defects of the display device according to the preferred embodiment of the present disclosure. As shown in FIG. 3, the display device includes a first substrate 301 and a polarizing sheet 302 disposed on the first substrate 301, wherein the first substrate 301 is provided with a plurality of pixels. For example, when a pixel B is an abnormal pixel, positions of the polarizing sheet 302 corresponding to the abnormal pixels B and two sides thereof are coated with the light diffusion glue 303.

Preferably, a spreading method can be used to coat the light diffusion glue.

In the method of weakening line defects of a display device of the present disclosure, firstly, an abnormal phenomenon of the display device is detected, and abnormal pixels corresponding to the abnormal phenomenon are confirmed; secondly, display information outputted to each of the abnormal pixels is cleared; and finally, a light diffusion glue is coated on positions of the polarizing sheet corresponding to the abnormal pixels and two sides thereof, such that the abnormal pixels are covered by display information of two sides of the abnormal pixels by the light diffusion glue, so as to eliminate influence in vision caused by defects, and manufacturing costs are also reduced.

The present disclosure has been described with preferred embodiments thereof and it is understood that many changes and modifications to the described embodiment can be carried out without departing from the scope and the spirit of the invention that is intended to be limited only by the appended claims.

What is claimed is:

1. A method of weakening line defects of a display device, wherein the display device comprises a first substrate and a polarizing sheet disposed on the first substrate, the method comprises steps of:
    detecting an abnormal phenomenon of the display device, and confirming abnormal pixels corresponding to the abnormal phenomenon;
    clearing display information outputted to each of the abnormal pixels; and
    coating a light diffusion glue on positions of the polarizing sheet corresponding to the abnormal pixels and two sides thereof, such that the abnormal pixels are covered by display information of two sides of the abnormal pixels by the light diffusion glue;
    wherein the abnormal phenomenon includes one or more defects including a dark line defect, a bright line defect, a broken line defect, and a weaken line defect; and
    the step of detecting the abnormal phenomenon of the display device, and confirming the abnormal pixels corresponding to the abnormal phenomenon includes steps of:
    executing a light-on test on the display device to display an image; and
    confirming the abnormal pixels by the image.

2. The method of weakening line defects of the display device according to claim 1, wherein each of the abnormal pixels is connected with a data driving chip by a data line.

3. The method of weakening line defects of the display device according to claim 2, wherein the display information is data signals outputted from the data driving chip.

4. The method of weakening line defects of the display device according to claim 2, wherein the step of clearing the display information outputted to each of the abnormal pixels includes step of:
    cutting the data line connected between the data driving chip and the abnormal pixel.

5. The method of weakening line defects of the display device according to claim 4, wherein the data line connected between the data driving chip and the abnormal pixel is cut by a laser.

6. The method of weakening line defects of the display device according to claim 1, wherein a spreading method is used to coat the light diffusion glue.

7. A method of weakening line defects of a display device, wherein the display device comprises a first substrate and a polarizing sheet disposed on the first substrate, and the method comprises steps of:
    detecting an abnormal phenomenon of the display device, and confirming abnormal pixels corresponding to the abnormal phenomenon;
    clearing display information outputted to each of the abnormal pixels; and
    coating a light diffusion glue on positions of the polarizing sheet corresponding to the abnormal pixels and two sides thereof, such that the abnormal pixels are covered by display information of two sides of the abnormal pixels by the light diffusion glue.

8. The method of weakening line defects of the display device according to claim 7, wherein the abnormal phenomenon includes one or more defects including a dark line defect, a bright line defect, a broken line defect, and a weaken line defect.

9. The method of weakening line defects of the display device according to claim 7, wherein the step of detecting the abnormal phenomenon of the display device, and confirming the abnormal pixels corresponding to the abnormal phenomenon includes steps of:
    executing a light-on test on the display device to display an image; and
    confirming the abnormal pixels by the image.

10. The method of weakening line defects of the display device according to claim 7, wherein each of the abnormal pixels is connected with a data driving chip by a data line.

11. The method of weakening line defects of the display device according to claim 10, wherein the display information is data signals outputted from the data driving chip.

12. The method of weakening line defects of the display device according to claim 10, wherein the step of clearing the display information outputted to each of the abnormal pixels includes step of:
    cutting the data line connected between the data driving chip and the abnormal pixel.

13. The method of weakening line defects of the display device according to claim 12, wherein the data line connected between the data driving chip and the abnormal pixel is cut by a laser.

14. The method of weakening line defects of the display device according to claim 7, wherein a spreading method is used to coat the light diffusion glue.

* * * * *